United States Patent

Chen

[11] Patent Number: 6,091,669
[45] Date of Patent: Jul. 18, 2000

[54] METHOD OF DETERMINING, DISPLAYING AND USING THE RELATIVE CHANGES OF ELASTIC MODULUS AND DENSITY OF UNDERGROUND ROCK

[75] Inventor: Xinping Chen, Gaobeidian, China

[73] Assignee: China National Offshore Oil Corp., Beijing, China

[21] Appl. No.: 09/077,138

[22] PCT Filed: Nov. 20, 1996

[86] PCT No.: PCT/CN96/00104

§ 371 Date: Sep. 29, 1998

§ 102(e) Date: Sep. 29, 1998

[87] PCT Pub. No.: WO97/19370

PCT Pub. Date: May 29, 1997

[30] Foreign Application Priority Data

Nov. 22, 1995 [CN] China .................. 95117487

[51] Int. Cl.[7] ............................................ G01V 1/34
[52] U.S. Cl. .......................... 367/37; 367/38; 367/68; 367/75; 367/57; 367/52; 367/43; 367/33
[58] Field of Search ................. 367/75, 52, 43, 367/40, 57, 33; 340/155

[56] References Cited

U.S. PATENT DOCUMENTS

| | | | |
|---|---|---|---|
| 4,316,267 | 2/1982 | Ostrander | 367/68 |
| 4,422,165 | 12/1983 | Thomas et al. | 367/40 |
| 4,646,239 | 2/1987 | Bodine et al. | 364/421 |
| 4,809,239 | 2/1989 | Esmersoy | 367/57 |
| 5,265,016 | 11/1993 | Hanson et al. | 367/75 |

FOREIGN PATENT DOCUMENTS

| | | |
|---|---|---|
| 0 113 944 | 7/1984 | European Pat. Off. . |
| 0 247 813 | 2/1987 | European Pat. Off. . |

*Primary Examiner*—Christine K. Oda
*Assistant Examiner*—Anthony Jolly
*Attorney, Agent, or Firm*—Alston & Bird LLP

[57] ABSTRACT

The general object of the present invention is to provide a method for determining and displaying the relative changes of elastic moduli and that of density of geologic formations and for utilizing these relative changes and plottings for gas/oil exploration, especially for direct gas and light oil detection. The said relative changes of elastic moduli are the relative change of Lame constant $\Delta\lambda/(\lambda+2\mu)$, the relative change of shear modulus $\Delta\mu/(\lambda+2\mu)$ and/or $\Delta\mu/[\kappa+(4/3)\mu]$, the relative change of bulk modulus $\Delta\kappa/[\kappa+(4/3)\mu]$; and the relative change of density is $\Delta\rho/\rho$.

6 Claims, 8 Drawing Sheets

(1 of 8 Drawing Sheet(s) Filed in Color)

METHOD OF DETERMINING, DISPLAYING AND USING THE RELATIVE CHANGES OF ELASTIC MODULUS AND DENSITY OF UNDERGROUND ROCK

FIELD OF THE INVENTION

The present invention relates to a seismic method for determining and displaying the relative changes of elastic moduli and that of density of geologic formations and utilizing said relative changes and displaying plots for oil and gas exploration, especially for direct gas and light oil detection.

BACKGROUND OF THE INVENTION

The physical parameters being used most often in oil and gas exploration are velocities and densities of rocks and wave impedance calculated from them. These physical parameters are appropriate for determining underground structures. Nevertheless they result in uncertainty in determining rock property and for direct hydrocarbon detection. Two reasons account for such uncertainty: (1) the variation ranges of velocities and densities for variety of rocks overlap each other to some extent. (2) P-wave velocity, S-wave velocity and density are closely related each other. They have very limited ability for compensating each other to indicate the variation of characteristics of rocks and their pore-filling fluid.

Elastic moduli of rock include Lame constants $\Delta$ and shear modulus $\mu$, the bulk modulus $\kappa$, Young's modulus E and Poisson's ration $\sigma$. Their first introduction into physics was in the field of material science. The way by which they are defined makes them all positive. Those five elastic moduli are not independent from each other. Any one of them can be expressed in terms of two others. Therefore the elastic moduli played an important role in wave equation theory development. It is usually difficult to measure the moduli directly. They are usually calculated using the shear- and compressional-wave velocity and density measured in lab.

Shear-wave velocity $V_s$ and compressional-wave velocity $V_p$ are related to elastic moduli in terms of density $\rho$. For example $$V_s = (\mu/\rho)^{1/2} \quad (1)$$

$$V_p = [(\lambda + 2\mu)/\rho]^{1/2} \quad (2)$$

$$= [(\kappa + 4\mu/3)/\rho]^{1/2} \quad (3)$$

By original meaning, rock's velocities in seismic exploration indicate only how fast the seismic waves travel through rock. Velocity has indirect relations to characteristics of rock and its pore-filling-fluid. Velocity results from comprehensive effect of moduli and density. Moduli, as compared with velocities, are more closely and more directly related to characteristics of rock and its pore-filling-fluid. The relative changes of elastic moduli and that of densities of geologic formations may have better ability to indicate changes in characteristics of geologic formations and their pore-filling-fluid directly. Therefore determining relative changes of elastic moduli and densities of geologic formations will be very useful for rock property study and direct hydrocarbon detection.

The Common-Depth-Point technique (hereinafter referred to as CDP technique) is one of the techniques which experienced great successes in the field of oil and gas exploration. The CDP technique have been developed and refined over forty years. Assuming a horizontally layered geologic formation, multiple coverage seismic data from each subsurface point can be recorded with CDP technique by using appropriate surface-detector and shot-point spreads. By sorting the seismic data recorded, CDP gathers can be composed. Stacking the traces within one CDP gather will enhance primary reflections from the same sub-surface reflection point and reduce multiple reflections and random noise. Unfortunately, while enhancing primary reflections, CDP stacking destroys valuable seismic information which is of crucial importance for direct hydrocarbon detection.

It has been recognized in theory since at least the end of last century that the amplitudes of shear and compressional reflectivity at a reflection boundary change with the angle of incidence. One of outstanding works is Zoeppritz equations which show that changing of the reflectivity with the angle of incidence is related to the elastic properties at the boundary, (see Zoeppritz, K., 1919, "Uber Erbeduellen", Vol. V II, *Gottinger Nachrichten*, p.66–84). People have paid their attention in recent years to the use of such changes in oil and gas exploration. Wiggins et al put forward a method for determining and displaying the shear-velocity reflectivities, (see Wiggins, R., Kenny, G. S. and McMlure, C. D., 1983, "A method for determining and displaying the shear-velocity reflectivities of a geologic formation", European Patent Application No. 93300227.2). Their formula was derived on the assumption of $V_p/V_o=2$ which may introduce unpredictable errors to the shear-velocity reflectivity. Because of its insensitivity to pore filling fluids in rocks, the shear-velocity reflectivity can be used in oil and gas explorations, but just because of this insensitivity, its use is limited. The AVO technique utilizes the variation of the P-wave reflection amplitude versus offset to predict the existence of gas reservoir, (see Ostrander, W. J., 1984, "Plane-wave reflection coefficients for gas sands at non-normal angles of incidence", *Geophysics*, Vol. 49, p. 1637–1648). It has been found that, in many cases, the gradient of P-wave reflection amplitude versus offset from gas-saturated sands encased in shale is bigger than that from brine-saturated sands encased in shale. Both Wiggins's patent and the AVO technique use pre-stacking CDP gathers as input data.

Since the advent of the CDP technique, great efforts have been done to determine compressional velocity $V_p$ and reflection coefficient of P-wave by using P-wave CDP data. Only in recent years did a few researchers suggest methods for determining elastic moduli or their relative changes by using CDP data. Piggott at el presented an iterative approach to determine Poisson ratio $\sigma$. Then Piggott at el derived the other four elastic moduli and $V_o$ in terms of $\rho$ such determined and $\rho$ and $V_p$ both of which are obtained from other sources, (see Piggott, J. D., Shrestha, R. K and Warwich, R. A., 1989, "Young's modulus from AVO Inversion", 59th Annual International SEG Meeting *Expanded Abstracts*, p. 832–835). Piggott at el's iterative approach requires that $\rho$ and $V_p$ are known, which is not realistic. Silva and Ahmed used a simplified approximation to the Zoeppritz equations in which $\Delta\kappa/\kappa$ and $\Delta\mu/\kappa$ appears as parts of coefficients, (Silva and Aimed's notations are changed to the present invention's for reading consistency). Instead of determining $\Delta\kappa/\kappa$ and $\Delta\mu/\kappa$, they determined, by fitting the amplitude variation with angle of incidence, the P-wave impedance and a modified version of S-wave impedance. Their approach is, in essence, the same as that of AVO technique, (see Silva, R. and Amhed, H., 1989, "Application of the AVO technique in production geophysics". 59th Annual International SEG Meeting, *Expanded Abstracts*, p.836–838). Smith and Gidlow presented a "pseudo-Poisson's ratio reflectivity" by subtracting the shear-velocity reflectivity from the compressional-velocity reflectivity, (see Smith, G. C. and Gidlow, P M., 1987, "Weighted stacking for rock property estimation and detection of gas, *Geophysical Prospecting*", Vol. 35, p.993–1014). It seems that none of the authors mentioned above did a research in earnest in the direction of determining either elastic moduli or their relative changes, but still worked mainly within the scope of conventional physical parameters, not far away from the old track.

The role of the rock's density in oil and gas exploration is well-known. Up till to the present, the conventional method for estimating the density or its relative change from seismic data is as follows: firstly, transforming RMS velocity obtained by velocity analysis into interval velocity (e.g. use Dix's formula), and then using empirical relation (e.g. Gardner's relation) to transform the interval velocity into the density. The density obtained above is of lower reliability, and sometimes is even no use. Extracting density and/or relative chance of the density of geologic formations directly from conventional P-wave seismic data can improve reliability of the density, and can result in a wider scope of its application.

Directly spotting hydrocarbon deposits with conventional P-wave seismic data has been pursued for nearly thirty years. A number of researchers have been working to find a better Direct Hydrocarbon Indicator (hereinafter referred to as DHM). 'Blight spot', 'flat point', 'dim zone', 'chimney effect' and 'polarity change' were a few of the DHls which achieved only limited success before the advent of AVO technique. AVO technique presents a variety of DHls to explorationists, on which Swan gave an excellent review and discussion (see Swan, H. W., 1993, "Properties of direct AVO hydrocarbon indicators", in Castagna, J. P. and Backus, M. M., Eds., *Offset-dependent reflectivity: Theory and practice of AVO analysis*: SEG). Castagna and Smith gave a detailed comparison of DHls derived from AVO and presented a new DHl, $R_p$–Rs with $R_p$ representing P-wave impedance and Rs representing S-wave impedance (see Castagna, J. P. and Smith, S. W., 1994, "Comparison of AVO indicators: A modeling study", *Geophysics*, Vol. 59, p. 1849–1855). In general, DHls from AVO have better theoretical bases and wider application scope and consequently achieved more success than earlier DHls. However, it has been found that P-wave reflection amplitude from gas-saturated sandstone encased in shale may increase or decrease with angle of incidence, controlled by a set of complicated factors. Moreover, brine-saturated sandstone can also result in amplitude variation versus offset similar to that of gas reservoir. It is difficult in most circumstances to predict hydrocarbon deposits by DHl from AVO. The AVO technique experienced success as well as failure in direct hydrocarbon detection. To find more powerful DHls is still an imminent and significant research task.

OBJECT OF THE INVENTION

The purpose of the present invention is to provide a method for determining the relative changes of elastic moduli and that of the density of geologic formations by using conventional P-wave surface seismic data as input data and a method for displaying and utilizing such relative changes in oil and gas exploration, especially in direct gas and light oil detection. The method provided by the present invention is useful for finding out the changes of characteristics of geologic formations and their pore-filling-fluid, and for identifying new prospects and increasing the number of prospects. The DHls provided by the present invention possess sound bases in rock physics and geophysics and can reduce risk of drilling a new prospect.

SUMMARY OF THE INVENTION

The present invention provides a method for determining, displaying and utilizing the relative chances of elastic moduli and that of density of geologic formations; the said relative changes of elastic moduli are the relative change of Lame constant $\Delta\lambda/(\lambda+2\mu)$, the relative change of shear modulus $\Delta\mu/(\lambda+2\mu)$ and/or $\Delta\mu/[\kappa+(4/3)\mu]$, the relative change of bulk modulus $\Delta\kappa/[\kappa+(4/3)\mu]$; and the relative change of density is $\Delta\rho/\rho$; comprising the steps of:

(a) collecting multiple coverage common-mid-point or common-depth-point seismic data using propriety surface detector- and shot-point spreads, the maximum of the incidence angles of seismic waves impinging at the reflection boundary of geologic formations of exploration target being within 30°~45° and being smaller than critical angle in the case of critical refection occurring;

(b) pre-processing the seismic data to obtain the post-processed and corrected common-reflection-point gathers so that the amplitude-versus-incidence-angle-variation of which at the same reflection time represents the reflection-coefficient-versus-incidence-angle-variation of the same subsurface reflection point, (c) estimating incidence angles of the same sampling time, i.e. the incidence angles from the same reflection point but with different offsets;

(d) fitting the reflection amplitudes and corresponding incidence angles of the same subsurface reflection point with a variety of offsets into the first approximate linear relation $$R(\theta) \approx A(1+\sin^2\theta\sin^2\theta tg^2\theta)/4 + B(1-3\sin^2\theta+\sin^2\theta tg^2\theta)/2 + C(1-\sin^2\theta-\sin^2\theta tg^2\theta)/4$$

and/or the second approximate linear relation $$R(\theta) \approx D(1+\sin^2\theta+\sin^2 tg^2\theta)/4 + E(1-5\sin^2\theta+\sin^2\theta tg^2\theta)/3 + C(1-\sin^2\theta-\sin^2\theta tg^2\theta)/4$$

which results in two over-determined linear equation groups; where $A=\Delta\lambda/(\lambda+2\mu)$, $B=\Delta\mu/(\lambda+2\mu)$, $C=\Delta\rho/\rho$, $D=\Delta\kappa/[\kappa+(4/3)\mu]$, $E=\Delta\mu/[\kappa+(4/3)\mu]$;

(e) solving the said over-determined linear equation groups to determine coefficient A, B, C and/or D, E, C, (f) repeating steps (c), (d) and (e) for each sampling time of a common-reflection-point gather, (g) repeating steps (c), (d), (e) and (f) for each common-reflection-point gather of a line, (h) displaying said coefficients determined above of each over-determined linear equation group by three plotting methods as follows: the single relative change profile, the comprehensive direct hydrocarbon detection profile and the crossplot; for the single relative change profile plotting method, one relative change, i.e. one coefficient, is plotted in one figure; for the comprehensive direct hydrocarbon detection profile plotting method, the three coefficients of one over-determined linear equation group are specially combined into one figure, according to their signs of value (i.e. positive or negative) or according to that they are bigger or smaller than their thresholds, being represented by different colors or symbols; for the plotting method of 2-dimensional crossplot, one from the three coefficients of one over-determined linear equation group is selected as reference variable while the other two coefficients as the abscissa and ordinate variable, different symbols or colors will be used to represent positive or negative of the reference variable; for the plotting method of 3-dimensional crossplot, it is plotted with the three coefficients of one over-determined linear equation group as X-, Y- and Z-variable, separately.

In addition, the present invention provides a further method for utilizing the relative changes and displaying pictures determined by the method mentioned above to predict gas/oil reservoir position, comprising the steps of:

(a) dividing the relative changes determined by the method mentioned above into two groups of direct hydrocarbon indicators. The first group consists of the direct hydrocarbon indicators A, B and C with A=$\Delta\lambda/(\lambda+2\mu)$, B=$\Delta\mu/(\lambda+2\mu)$, C=$\Delta\rho/\rho$; and the second group comprises the direct hydrocarbon indicators D, E and C with D=$\Delta\kappa/[\kappa+(4/3)\mu]$, E=$\Delta\mu/[\kappa+(4/3)\mu]$, C=$\Delta\rho/\rho$;

(b) determining the threshold of each direct hydrocarbon indicator empirically, (c) plotting the comprehensive direct hydrocarbon detection profile using the three thresholds determined above and the plotting method mentioned above;

(d) predicting possible gas/oil reservoir position on the basis of the comprehensive direct hydrocarbon detection profile by the following method; in the case of using the first group of direct hydrocarbon indicators, the possible gas/oil reservoir location is indicated by the area wherein the relative change of shear modulus $\Delta\mu/(\lambda+2\mu)$ is larger than its threshold and both the relative change of Lame constant $\Delta\lambda/(\lambda+2\mu)$ and the relative chance of density $\Delta\rho/\rho$ are smaller than the corresponding thresholds; in the case of the second group of direct hydrocarbon indicators, the possible gas/oil reservoir location is in the area wherein the relative change of shear modulus $\Delta\mu/(\lambda+2\mu)$ is larger than its threshold and both the relative change of bulk modulus $\Delta\kappa/[\kappa+(4/3)\mu]$ and the relative change of density $\Delta\rho/\rho$ are smaller than the corresponding thresholds.

DESCRIPTION OF THE DRAWINGS

The file of this patent contains at least one color drawing executed in color. Copies of this patent with color drawing(s) will be provided by the Patent and Trademark Office upon request and payment of the necessary fee.

DESCRIPTION OF THE INVENTION

Figure 1:
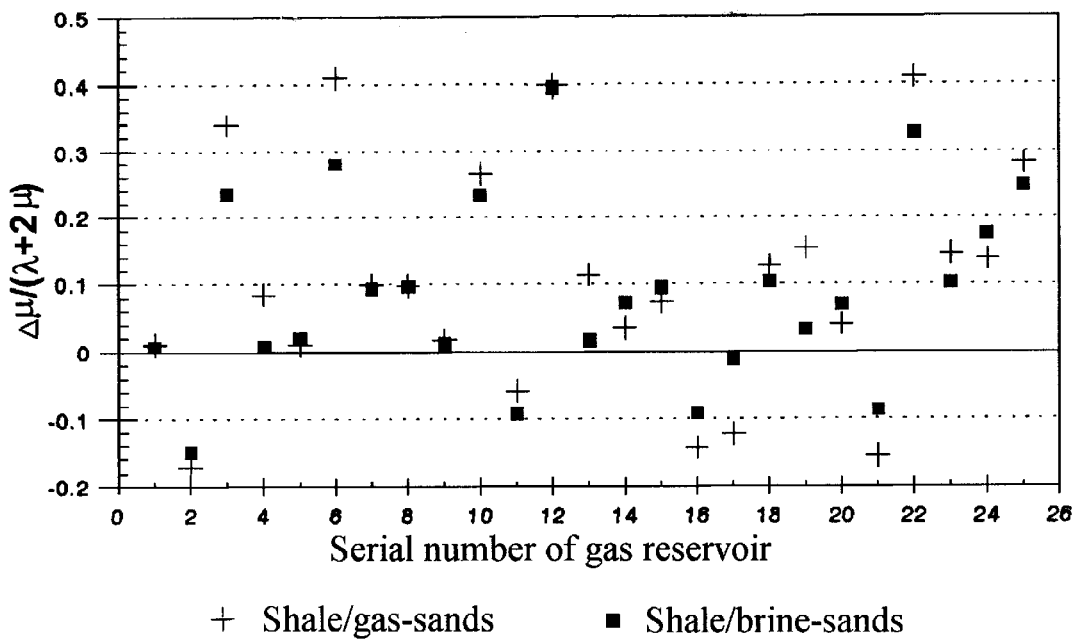
FIG. 1 shows the relative changes of shear modulus, $\Delta\mu/(\lambda+2\mu)$, of 25 reflection boundaries of shale/gas-saturated sands and that of their corresponding reflection boundaries of shale/brine-saturated sands.

In order to understand clearly the method of the present invention for determining the relative changes of elastic moduli and that of density of geologic formations, a brief description of some basic principles of the reflection and transmission of seismic waves impinging on reflection boundary of geologic formation is presented. When P-waves impinge vertically on reflection boundary, only reflection and transmission P-waves are generated. When P-waves impinge obliquely on reflection boundary, transformed waves i.e. reflection and transmission S-waves are generated in addition to reflection and transmission P-waves. Energies of the wave modes, i.e. reflection and transmission coefficients, depend on P- and S-waves velocities and densities of rocks on both sides of the reflection boundary. Zoeppritz equations express such relations. But in the practice, the exact Zoeppritz equations are very complex and require for their solutions a priori information which is, in general, not available. Therefore, several authors presented approximations to the Zoeppritz equations for different purposes and on different assumptions. The present invention uses the approximation given by Aki and Richards which has been widely used (see Aki, K. I. and Richards, P. G., 1980, "Quantitative Seismology", *W. H. Freeman and Co.*, P. 153). Provided the percentage changes in elastic properties on both sides of a reflection boundary are small, the P-wave reflectivity $R(\theta)$ can be written as $$R(\theta) = \frac{1}{2}\left(1 - 4\frac{V_s^2}{V_p^2}\sin^2\theta\right)\frac{\Delta\rho}{\rho} + \frac{1}{2}\sec^2\theta\Delta\frac{V_p}{V_p} - 4\frac{V_s^2}{V_p^2}\sin^2\theta\Delta\frac{V_s}{V_s} \quad (4)$$

where $$V_p = (V_{p2} + V_{p1})/2 \qquad \Delta V_p = V_{p2} - V_{p2}$$
$$V_s = (V_{s2} + V_{s1})/2 \qquad \Delta V_s = V_{s2} - V_{s1}$$
$$\rho = (\rho_2 + \rho_1)/2 \qquad \Delta\rho = \rho_2 - \rho_1$$
$$\theta = (\theta_2 + \theta_1)/2$$

$V_{p1}$, $V_{x1}$ and $\rho_1$ are compressional-velocity, shear-velocity and density of the overlying medium of the boundary, respectively;

$V_{p2}$, $V_{n2}$ and $\rho_2$ are compressional-velocity, shear-velocity and density of the underlying medium of the boundary, respectively;

$V_{p2}$, $V_x$, and $\rho$ are average values of compressional-velocity, shear-velocity and density of the overlying and underlying medium of the boundary, respectively;

$\theta_1$, and $\theta_2$ are incidence and transmission angles, respectively.

Because traveling velocities of seismic waves within rock depend on the elastic moduli and density of the rock, velocities in Eq.(4) can be expressed in terms of elastic moduli and density. Let $\lambda_1$, $\mu_1$ and $\kappa_1$ represent the elastic moduli of the overlying medium, $\lambda_2$, $\mu_2$ and $\kappa_2$ represent the elastic moduli of the underlying medium. Let $\lambda$, $\mu$ and $\kappa$ be, respectively $$\lambda=(\lambda_1+\lambda_2)/2$$
$$\mu=(\mu_1+\mu_2)/2$$
$$\kappa=(\kappa_1+\kappa_2)/2$$

Since percentage changes in the elastic properties are small, so equations $$V_s \cong (\mu/\rho)^{1/2} \quad (5)$$

and $$V_p \cong [(\lambda+2\mu)/\rho]^{1/2} \quad (6)$$

$$\cong [(\kappa+4\mu/3)/\rho]^{1/2} \quad (7)$$

are tenable with small percentage errors relative to the real average values.

Differentiating (5) and (6) gives $$\frac{\Delta V_s}{V_s} = \frac{1}{2}\left(\frac{\Delta\mu}{\mu} - \frac{\Delta\rho}{\rho}\right) \quad (8)$$

$$\frac{\Delta V_p}{V_p} = \frac{1}{2}\left(\frac{\Delta\lambda+2\Delta\mu}{\lambda+2\mu} - \frac{\Delta\rho}{\rho}\right) \quad (9)$$

And $$\left(\frac{V_s}{V_p}\right)^2 = \frac{\mu}{\lambda+2\mu} \quad (10)$$

holds. Substitute Eq.(8), (9) and (10) into Eq. (4). After some manipulating, Eq.(4) can be transformed into $$R(\theta) \cong A(1+\sin^2\theta+\sin^2\theta tg^2\theta)/4 + B(1-3\sin^2\theta+\sin^2\theta tg^2\theta)/2 + C(1-\sin^2\theta-\sin^2\theta tg^2\theta)/4 \quad (11)$$

where $$A=\Delta\lambda/(\lambda+2\mu) \quad (12)$$

$$B=\Delta\mu/(\lambda+2\mu) \quad (13)$$

$$C=\Delta\rho/\rho$$

If Eq.(7) is used instead of Eq.(6), similar derivation results in $$\frac{\Delta V_p}{V_p} = \frac{\Delta\kappa+\frac{4}{3}\Delta\mu}{\kappa+\frac{4}{3}\mu} - \frac{\Delta\rho}{\rho} \quad (15)$$

$$\left(\frac{V_s}{V_p}\right)^2 = \frac{\mu}{\kappa+\frac{4}{3}\mu} \quad (16)$$

$$R(\theta) \cong D1+\sin^2\theta+\sin^2\theta tg^2\theta)/4$$
$$+E(1-5\sin^2\theta+\sin^2\theta tg^2\theta)3+C(1-\sin^2\theta-\sin^2\theta tg^2\theta)/4 \quad (17)$$

where $$D \cong \Delta\kappa/[\kappa+(4/3)\mu] \quad (18)$$

$$E=\Delta\mu/[\kappa+(4/3)\mu] \quad (19)$$

$C=\kappa\rho/\rho$ is the same as Eq. (14)

The seismic data should be properly pre-processed before being fitted into Eq.(11) and Eq.(17) to determine the coefficients A, B, C, D and E. During the derivation of Eq.(11) and Eq.(17), it was assumed that a plane P-wave impinges on a horizontal elastic boundary, and $R(\theta)$ in Eq.(11) and (17) is the P-wave reflectivity rather than a convolution of reflection coefficients and seismic wavelet. The seismic data should be pre-processed to cope with such assumptions as possible. In connection with the CDP technique, a number of techniques have already been developed which can be used in the pre-processing required by the present invention. The preprocessing flow usually consists of (1) amplitude recovery and compensation to compensate geometrical divergence, transmission loss, non-elastic attenuation and variation versus offset; (2) surface consistency correcting to remove non-consistency effects from source, receiver and shallow medium; (3) filtering to eliminate noise and unwanted reflection events such as multiples and S-wave conversions; (4) velocity analysis and NMO correction; (5) muting to zero out direct arrivals and NMO correction stretches; (6) deconvoluting in order to suppress multiples; (7) compressing wavelet to reduce the thin layer tuning effect and to remove the seismic wavelet as well as possible. If the underground structure is far from the horizontal layer assumption, DMO and pre-stack migration can be used to convert Common-Middle-Point (hereinafter referred to as CW) gathers into Common-Reflection-Point (hereinafter referred to as CRP) gathers. If the underground structure has to be considered as 3-dimensional, the CRP gathers should be CRP bins.

The incidence angle $\theta$ is determined by the offset and reflection point depth. The calculation procedure for $\theta$ should be selected according to the complexity of the underground structure. If the underground medium is homogeneous on velocity (constant P-wave velocity), then $$\theta = \mathrm{arc}tg(X/2Z) \quad (20)$$

where

Z is the depth of the reflection boundary,

X is the offset from source to receiver.

If the P-wave velocity of the underground medium is a linear function of the depth i.e.

$$V_p = V_0 + KZ \quad (21)$$

then $$\theta = \mathrm{arctg}\left(\frac{4X(V_0+KZ)}{4KZ^2+8V_0Z-KX^2}\right) \quad (22)$$

where

K is a constant with the dimension of second$^{-1}$, $V_0$ is the P-wave velocity at Z=0, Z and X are the same as in Eq. (20).

If the underground medium is of horizontal layers and the P-wave velocity $V_p$ is constant within each layer, then $$\theta = \arcsin\left(\frac{XV_p}{V_{rms}\sqrt{V_{rms}^2 t_0^3 + X^2}}\right) \quad (23)$$

where $t_0$ is the vertical reflection time, i.e. reflection time when offset is zero, $V_{rms}$ is the Root-Mean-Square velocity, X is the sane as in Eq.(20).

If the underground medium is of complex 2-dimensional or 3-dimensional medium, the incidence angles should estimated by, for example, ray-trace method. The present inventor gave a detailed summary on how to calculate θ in different circumstances, (See Chen, X P., "A lecture note on AVO", *China Offshore Oil And Gas*, Special Issue (to be published)).

Since higher order terms, i.e. $\sin^2\theta\tan^2\theta$, are included, Eq. (11) and (17) possess better precision than the equation utilized by the existing AVO technique in which higher order term is ignored. Higher order term of $\sin^2\theta\tan^2\theta$ cannot be ignored if the incidence angle is larger than 25°. Therefore the incidence angles are usually limited within 25° in the existing AVO technique. The present invention uses Eq.(11) and (17) with higher order term of $\sin^2\theta\tan^2\theta$ being included. And so, the limitation to incidence angles can be increased up to 45°. The precision of Eq. (11) and (17) is related to the characteristics of the reflection boundary, i.e. to the differences of elasticity of rocks on the both sides of the boundary. The variation range of incidence angles should be selected from within 0°~30° to within 0°~45° according to in-situ conditions. The incidence angles θ should be smaller than critical angle if critical reflection occurs.

With properly pre-processed seismic data and the incidence angle calculated above, the amplitudes from the same subsurface reflection point but with different offsets can be fitted into Eq.(11) to form over-determined linear equation group and to determine coefficients A, B and C by multiple linear regression calculation technique, Similarly, if Eq.(17) being used, the coefficients D, E and C can be determined. To reduce noise effects on calculation, multiple linear regression technique and the calculation procedure must be carefully selected to ensure reliability of the calculation results. It is important for the procedure to provide with parameters to evaluate the reliability of the calculation and to detect breakdown of the linear regression.

The method for solving the over-determined linear equation group Eq.(11) and Eq.(17) is not limited to multiple linear regression technique. Any other calculation technique suitable for solving over-determined linear equation group can be utilized. Calculation techniques which are immune from measurement errors are more favorable in the present invention.

The displaying methods for the relative changes determined above provided by the present invention are as follows:

The present invention provides three displaying methods for the relative changes determined above. They are the single relative change profile, the comprehensive direct hydrocarbon detection profile and the crossplot.

For the single relative change profile plotting method, one relative change, i.e. one coefficient (A, B, C, D or B), is plotted in one figure. The single relative change profile can show one relative change's variation, big or small rising or dropping.

For the comprehensive direct hydrocarbon detection profile plotting method, the three coefficients of one over-determined linear equation group are specially combined into one figure according to their signs of value (i.e. positive or negative) or according to that they are bigger or smaller than their thresholds, and are represented by different colors or symbols. Take the three coefficients, $A=\Delta\lambda/(\lambda+2\mu)$, $B=\Delta\mu/(\lambda+2\mu)$, $C=\Delta\rho/\rho$, of the over-determined linear equation group Eq.(11) (hereafter referred to as the first over-determined linear equation group) as an example, eight colors or signs can be used to represent all kinds of combinations of their signs or their relative relations to the thresholds, for example, let red represent $\Delta\mu>0$, $\Delta\lambda<0$, $\Delta\rho<0$, let blue represent $\Delta\mu<=0$, $\Delta\lambda>=0$, $\Delta\rho>=0$, and so on.

There are two kinds of crossplots provided by the present invention, i.e. 2-dimensional and 3-dimensional crossplots. The three coefficients of one over-determined linear equation group are combined and plotted in one figure. The plotting method of 2-dimensional crossplot is as follows: selecting one coefficient from the three coefficients as reference variable, the other two as ordinate and abscissa, the crosspoints are plotted with different symbols or colors according to the sign (i.e. positive or negative) of the reference variable. Take the coefficients of the first over-determined linear equation group as an example, let C (i.e. $\Delta\rho/\rho$) be the reference variable, A (i.e. $\Delta\lambda/(\lambda+2\mu)$) be the abscissa variable (i.e. X-variable), B (i.e. $\Delta\mu/(\lambda+2\mu)$) be the ordinate variable (i.e. Y-variable), different symbols or colors can be used to indicate positive or negative of the reference variables. 2-dimensional crossplot plotted in this way can display information in eight quadrants of 3-dimensional space. 3-dimensional crossplot is plotted with A, B and C (or coefficients D, E, C) being X-, Y- and Z-variable, respectively. 3-dimensional crossplot is usually plotted in colors in order to distinguish crosspoints in eight quadrants.

The plotting space of the three plotting modes mentioned above can be selected as horizontal space~time, horizontal space~depth, horizontal space~horizontal space (i.e. time slice), depth~depth (i.e. depth slice). The plottings can be solid or perspective figures.

The coefficients A, B, C, D and E determined above can express the relative changes of moduli of geologic formations and that of the densities. These relative changes are closely and directly related to changes in characteristics of geologic formations and their pore-filling-fluids. And so they can be used for litho-seismic study. But their most important use is to detect hydrocarbon directly In order to understand clearly the method provided by the present invention for predicting gas/oil deposits by utilizing the relative changes determined above and corresponding plottings, a brief introduction to rock physics theory and statistical conclusions extracted from rock elasticity measurement will be stated as the follows.

Boit-Gassmann theory has been used in rock physics for over forty years, (see Gassmann, F., 1951, "Elastic waves through a packing of spheres", *Geophysics*, Vol. 16, p.637–685). It can be stated, in short, as $$\mu = \mu_b \tag{24}$$

$$\lambda = \lambda_b + \frac{\left(1 - \frac{\kappa_b}{\kappa_s}\right)^2}{\frac{\varphi}{\kappa_f} + \frac{(1-\varphi)}{\kappa_s} - \frac{\kappa_b}{\kappa_s^2}} \tag{25}$$

$$\kappa = \kappa_b + \frac{\left(1 - \frac{\kappa_b}{\kappa_s}\right)^2}{\frac{\varphi}{\kappa_f} + \frac{(1-\varphi)}{\kappa_s} - \frac{\kappa_b}{\kappa_s^2}} \tag{26}$$

where $\mu$=shear modulus of the brine-saturated rock $\mu_b$=shear modulus of the gas-saturated rock (i.e. that of the rock matrix)

$\lambda$=Lame constant of the brine-saturated rock $\lambda_b$=Lame constant of the gas-saturated rock (i.e. that of the rock matrix)

κ=bulk modulus of the brine-saturated rock
$\kappa_b$=bulk modulus of the gas-saturated rock (i.e. that of the rock matrix)
$\kappa_x$=bulk modulus of the minerals which build the rock matrix
$\kappa_f$=bulk modulus of the pore filling fluid
φ=the porosity of the rock Eq.(24) states that shear modulus $\mu$ of rock will not be changed when the rock's pore-filling-fluid is changed from water to gas. Eq.(25) predicts that Lame constant $\lambda$ of rock will decrease when the rock's pore-filling water is replaced by gas and the degree of its decrease is determined by the rock's porosity φ, bulk modulus of the gas-saturated rock $\kappa_b$, and bulk modulus $\kappa_x$, of the mineral which build the rock matrix. The reason for the decrease is that the bulk modulus of water is about 2.32 GPa while that of gas is nearly zero. Similar conclusion about rock's bulk modulus κ can be derived from Eq.(26) that rock's bulk modulus will decrease when the rock's pore-filling water is replaced by gas and the degree of its decrease is determined by the same factors. Since $\kappa=\lambda+2\mu$, the variation of κ is affected by both $\lambda$, and $\mu$. Lame constant $\lambda$ and $\mu$ are simple, basic elastic moduli while bulk modulus κ, Young's modulus E and Poisson's ratio σ are compound moduli. Although the definition of bulk modulus κ in material science is clearer and more definite than that of the Lame constant $\lambda$ the latter possesses clearer and more definite indication ability when acting as DHI.

When deriving the Eq.(24), (25) and (26), both Gassmann and Biot made the following assumptions about the rock's structure and shape of its pore: 1) macroscopically, the porous rock is assumed to be homogeneous, the pores are assumed to be much smaller than wavelength of seismic wave so that during an half cycle of the seismic disturbance the stress resulted from the seismic disturbance acting on the small element consisting of pore-filling-fluid and its surrounding rock frame can be from the initial equilibrium state to a new equilibrium state; 2) all pores are assumed to be in connection so that if the rock is in "open system" state and under the action of unbalanced stress the pore-filling-fluid can flow through the pores, and can be drained out through the surface of the rock, 3) the stress resulted from seismic disturbance is assumed to be small enough to meet Hooke's law. Prediction errors will exist if the above three assumptions are not met. Results from laboratory measurement and rock physics study prove that predictions of the Eq.(24), (25) and (26) are quite accurate for "clean" sandstone. It is also proved that for sandstone containing a percentage of clay the shear modulus $\mu$ increases a little while Lame constant $\lambda$, bulk modulus κ and density ρ decrease significantly when rock's pore-filling water is replace by gas. Even very low gas-saturation can result in significant decrease of $\lambda$ and κ.

Figure 2:
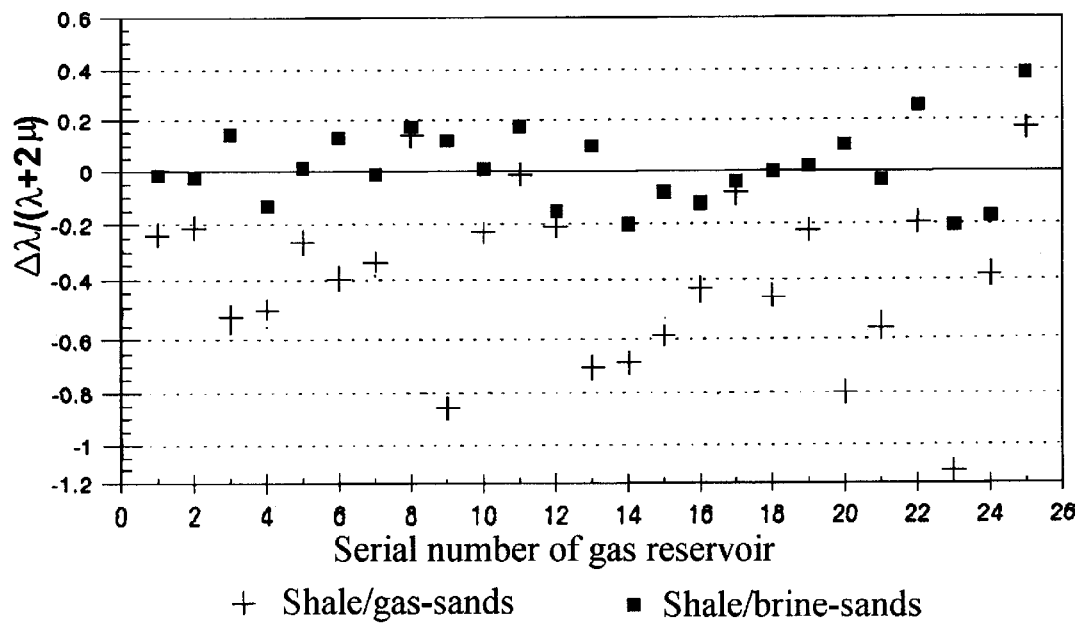
FIG. 2 shows the relative changes of Lame constant, $\Delta\mu/(\lambda+2\mu)$, of the same reflection boundaries as in FIG. 1.
Figure 3:
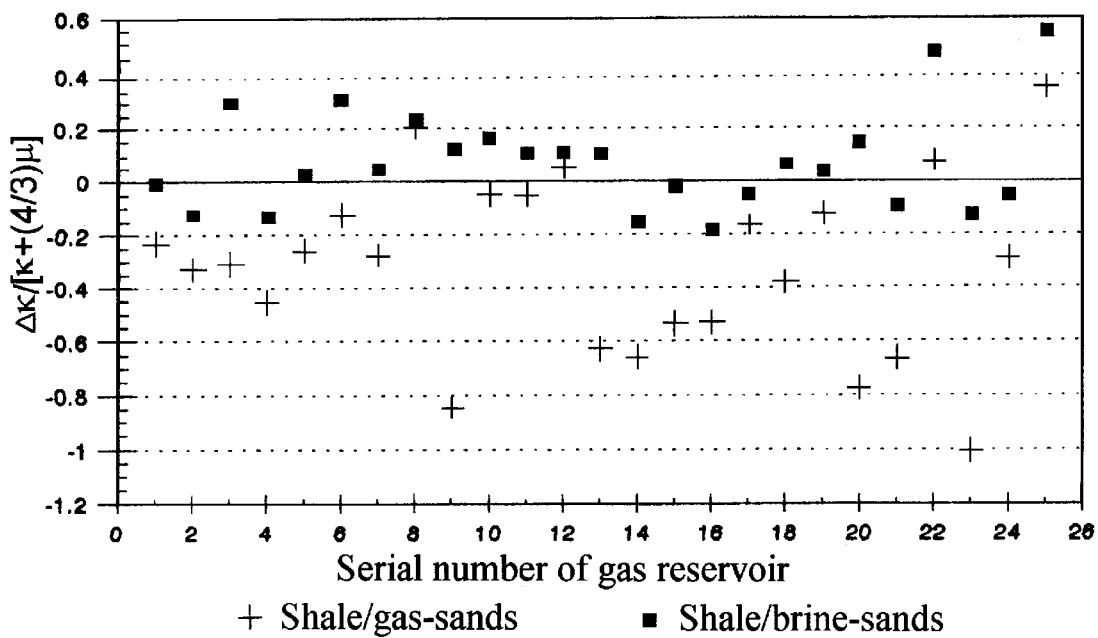
FIG. 3 shows the relative changes of bulk modulus, $\Delta\kappa/[\kappa+(4/3)\mu]$, of the same reflection boundaries as in FIG. 1.
Figure 4:
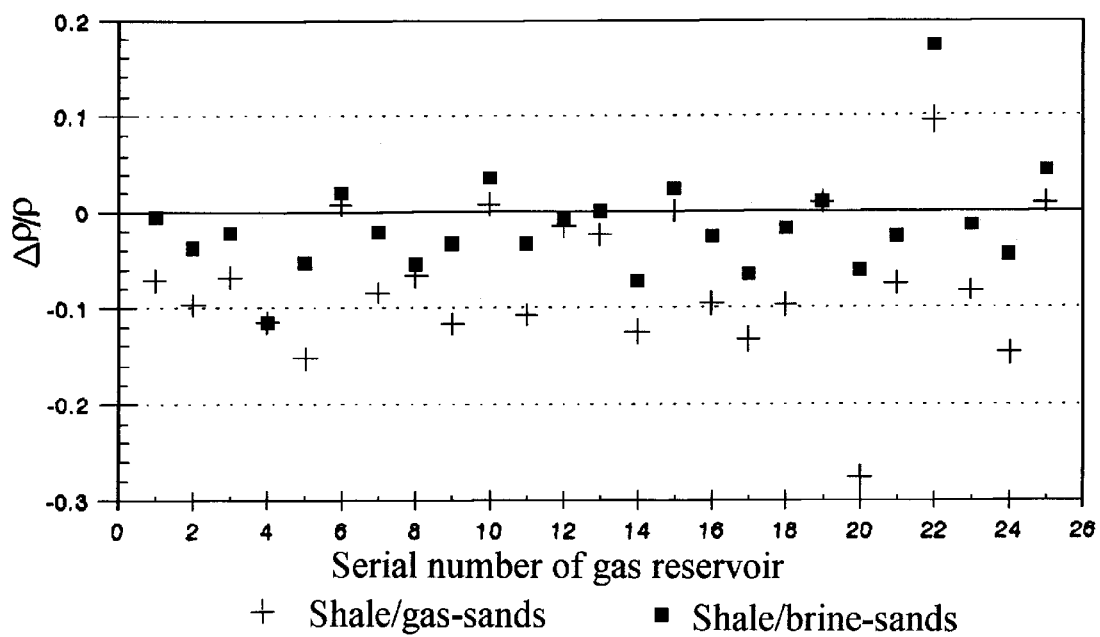
FIG. 4 shows the relative changes of density, $\Delta\rho/\rho$, of the same reflection boundaries as in FIG. 1.

The above statement is about the variations of elastic moduli and density of the same rock with different kind of pore-filling-fluid. The most important type of reservoir in gas/oil exploration is sandstone encased by shale. Shear modulus of sandstone is usually larger than that of shale. Both Lame constant $\lambda$ and bulk modulus κ of gas-saturated sandstone usually are smaller than that of cap shale. Density of gas-saturated sandstone, in most cases, is smaller than that of cap shale. FIG. 1 to FIG. 4 show the relative chances of moduli and that of density of upper boundaries of 25 gas reservoirs. Symbols "+" in these figures represent the relative changes of moduli and density of shale/gas-saturated sandstone reflection boundary while the black square symbols represent that of shale/brine-saturated sandstone reflection boundary. FIG. 1 shows the relative changes of shear modulus (i.e. coefficient B and E). It can be seen that there are only 5 negative values in 25 gas-reservoirs. It is thus evident that increase in shear modulus can indicate the existence of sandstone. FIG. 2 shows the relative changes of Lame constant $\lambda$ (i.e. coefficient A). It can be seen that all are negative except two positives and one near zero for the reflection boundaries of shale/gas-saturated sandstone from 25 gas reservoirs. Furthermore, the majority of the relative changes of Lame constant $\lambda$ for the reflection boundaries of shale/brine-saturated sandstone are mostly either positive or near zero; and the relative change of Lame constant $\lambda$ for reflection boundary of shale/gas-saturated sandstone is more negative (i.e. negative with larger absolute value) than that of the corresponding reflection boundary of shale/brine-saturated sands if the latter is negative. Therefore, the negative value of the relative change of Lame constant $\lambda$ together with positive value of relative change of shear modulus $\mu$ can indicate that the sandstone may be gas-saturated sandstone. Being similar to FIG. 2, FIG. 3 shows the relative changes of bulk modulus κ (i.e. coefficient D). Since the relative change of bulk modulus κ is determined by the relative changes of both $\lambda$ and $\mu$, its hydrocarbon indication ability is similar to that of $\lambda$ but not as good as that of $\lambda$. FIG. 4 shows the relative changes of density (i.e. coefficient C). All of them are negative except five positives and one near zero for the reflection boundaries of shale/gas-saturated sandstone from 25 gas reservoirs. The majority of the relative changes of density for the reflection boundaries of shale/brine-saturated sandstone are negative, too; nevertheless, the relative change of the density for reflection boundaries of shale/gas-saturated sandstone is more negative (i.e. negative with larger absolute value) than that of the corresponding reflection boundary of shale/brine-saturated sandstone if the latter is negative. So, the relative change of the density possesses significant hydrocarbon indication ability, too. P-wave velocity, S-wave velocity and density of shale, of gas-saturated sandstone and of the corresponding brine-saturated sandstone, which were used for preparing FIG. 1 to FIG. 4, were taken from Castagna, J. P. and Smith, S. W., 1994, "Comparison of AVO indicators: A modeling study", *Geopysics*. Vol. 59, p.1849–1855.

The method provided by the present invention for utilizing the relative changes and displaying pictures mentioned above to predict gas/oil reservoir location includes the following steps:

(a) Dividing the relative changes such determined into two groups of DHIs. The first group of DHIs is A, B, C with $A=\Delta\lambda/(\lambda+2\mu)$, $B=\Delta\mu/(\lambda+2\mu)$, $C=\Delta\rho/\rho$, and the second group of DHIs is D, E, C with $D=\Delta\kappa/[\kappa+(4/3)\mu]$, $E=\Delta\mu/[\kappa+(4/3))\mu]$, $C=\Delta\rho/\rho$.

(b) Determining the threshold of each DHI by experience. If the knowledge about exploration area is very limited which results in undetermined threshold, simply set the thresholds to zero.

(c) Plotting the comprehensive direct hydrocarbon detection profile by using the thresholds and plotting method determined above.

(d) Predicting gas/oil reservoir position using the comprehensive direct hydrocarbon detection profile by the following method: if the first group of DHIs are employed, possible gas/oil reservoir position is indicated by the area wherein the relative change of shear modulus $\Delta\mu/(\lambda+2\mu)$ is larger than its threshold and both the relative change of Lame constant $\Delta\lambda/(\lambda+2\mu)$ and the relative change of density $\Delta\rho/\rho$ are smaller than the corresponding thresholds; if the second group of DHIs are employed, possible gas/oil reservoir position is indicated by the area wherein the relative change of shear modulus $\Delta\mu/(\lambda+2\mu)$ is larger than its threshold and both the relative change of bulk modulus $\Delta\kappa/[\kappa+(4/3)\mu]$ and the relative change of density $\Delta\rho/\rho$ are smaller than the corresponding thresholds.

Attention should be paid to two exception cases when the DHIs provided by the present invention are used for direct hydrocarbon detection. (1) The shear modulus of sandstone may be smaller than that of cap shale if the sandstone is of large porosity and is of low compaction. This kind of sandstone is usually of low density. After being gas-saturated, its density will be definitely lower than that of cap shale. In this case the relative change of density is more significant for direct hydrocarbon detection. (2) The Lame constant $\lambda$ of gas-saturated over-compacted sandstone may be nearly the same as that of brine-saturated ones and may be even larger than or nearly the same as that of cap shale due to the bulk modulus of the rock matrix is nearly the same as that of the minerals of which this kind of 'hard' sandstone consists. Because of these exceptions and the complexity of gas/oil reservoirs and their cap rocks, the majority of the relative changes of elastic moduli and that of density of reflection boundaries for shale-gas-saturated sandstone shown in FIG. 1 to FIG. 4 are basically, but not completely in keeping with the role "shear modulus $\mu$ increases, Lame constant $\lambda$ and density $\rho$ decrease". In order to avoid prediction mistake it is important for explorationists to study the variation of these relative changes along both vertical direction and horizontal (i.e. geologic formation's extension) direction and to turn to pull account the relations among the three DHIs of each group.

Characteristics of the reflection boundary for shale/oil-saturated sandstone are in the midway between that of shale/gas-saturated sandstone and that of shale/brine-saturated sandstone, and are related to characteristics of the oil filling rock's pores(light or heavy oils). DHIs provided by the present invention should be used according to the in-situ condition. Light oil usually contains some volatile compositions. Very low gas saturation can result in significant decrease of both Lame constant $\lambda$ and bulk modulus $\kappa$. The shear modulus of oil-saturated sandstone is usually larger than that of cap shale. The density of light-oil-saturated sandstone is usually lower than that of brine-saturated sandstone. DHIs provided by the present invention can be used for direct oil reservoir detection, especially light oil reservoir.

In order to achieve higher success rate in gas/oil prediction, it is important to select proper thresholds using every possible information from geology, geophysics, well logging and rock physics. The actors related to selecting thresholds include reflection characteristics of the prospecting targets, background of the relative change determined by the single relative change profiles and the crossplot, research achievements of rock physics and well logging. It is very helpful to select multiple groups of thresholds and to plot corresponding comprehensive direct hydrocarbon detection profiles and then to observe the chances of the possible gas/oil deposit positions. It is very convenient for doing such observation with the powerful graphic ability of modern computer workstations.

The direct gas and light oil detection method provided by the present invention is better than that used previously. The method provided by the present invention can help explorationists to obtain every possible changes of characteristics of geologic formations and that of their pore-filling-fluid by analyzing reflection amplitude-versus-offset which is a comprehensive expression of the characteristics of geologic formations and pore-filling-fluid, and then to predict gas/oil deposits. The DHIs provided by the present invention are better than the ones previously used. Firstly, The DHIs provided by the present invention predict gas/oil deposits by directly indicating characteristic changes of geologic formations and that of their pore-filling-fluid, therefore, they really can directly indicate gas/oil deposits. While the existing DHIs predict gas/oil deposits by using reflection amplitude directly. For example, the earliest DMI 'bright spot' utilizes strong reflection amplitude, current DHIs 'intercept' and 'gradient' from AVO technique utilize zero-offset reflection amplitude and gradient of amplitude versus offset. Secondly, in the two groups of DHIs provided by the present invention, each of the three DHIs has its own special hydrocarbon indication ability. At the same time, their hydrocarbon indication abilities of the three DHIs in one group are associated and compensated each other. Increase in shear modulus indicates that the rock is more rigorous, which is an indication for possible existence of sandstone or other hard rocks. Decrease in Lame constant $\lambda$ predicts possible changes in characteristics of rocks pore-filling-fluid. Decrease in density indicates possible higher porosity percent and/or replacing water by gas/oil. DHIs currently used by gas/oil exploration utilize only superficial and single characteristic of seismic reflection waves (e.g. strength of amplitude, phase changes and soon) to predict gas/oil deposits. The two groups of DHIs provided by the present invention directly indicate the changes in characteristics of geologic formations and that of their pore-filling-fluid and the changes in porosity. So, they offer evidences of gas/oil deposits from many aspects. Thirdly, although the assumptions of the method provided by the present invention Is the same as AVO technique, higher order terms (i.e. $\sin^2\theta tg^2\theta$) are included in the equations used by the present invention, which results in better precision inversion and better utilization of seismic data. No more assumptions are made when the DHIs provided by the present invention are put into practical applications. This is different from some of the existing DHIs whose assumptions are reasonable in theory but more assumptions have to be added for practical applications. Fourthly, plotting modes for the DHIs provided by the present invention are striking, multiple, audio-visual and convenient for explorationists to observe DHIs characteristics and their changes from multiple directions and spaces.

Although elastic moduli have been used in geophysics for a long time, they are mainly used for theoretical research. The present invention turns the elastic moduli as the parameters for theoretical research to the parameters for practical application in gas/oil exploration. This enlarged application scope will bring new ideas into gas/oil exploration and result in revolution to some extent. It is well-known that density of geologic formation plays an important role in gas/oil exploration. Previously, the method for estimating density or its changes from seismic data was to convert RMS velocity obtained from velocity analysis into interval velocity (e.g. by Dix formula), and then to convert interval velocity into density according to empiric relationships (e.g. Gardner relation). The density estimated above is of low reliability, even no use. The present invention estimates the relative changes of density directly from seismic data, which results in better precision and wider application scope.

Description of the Specific Embodiment

Figure 6:
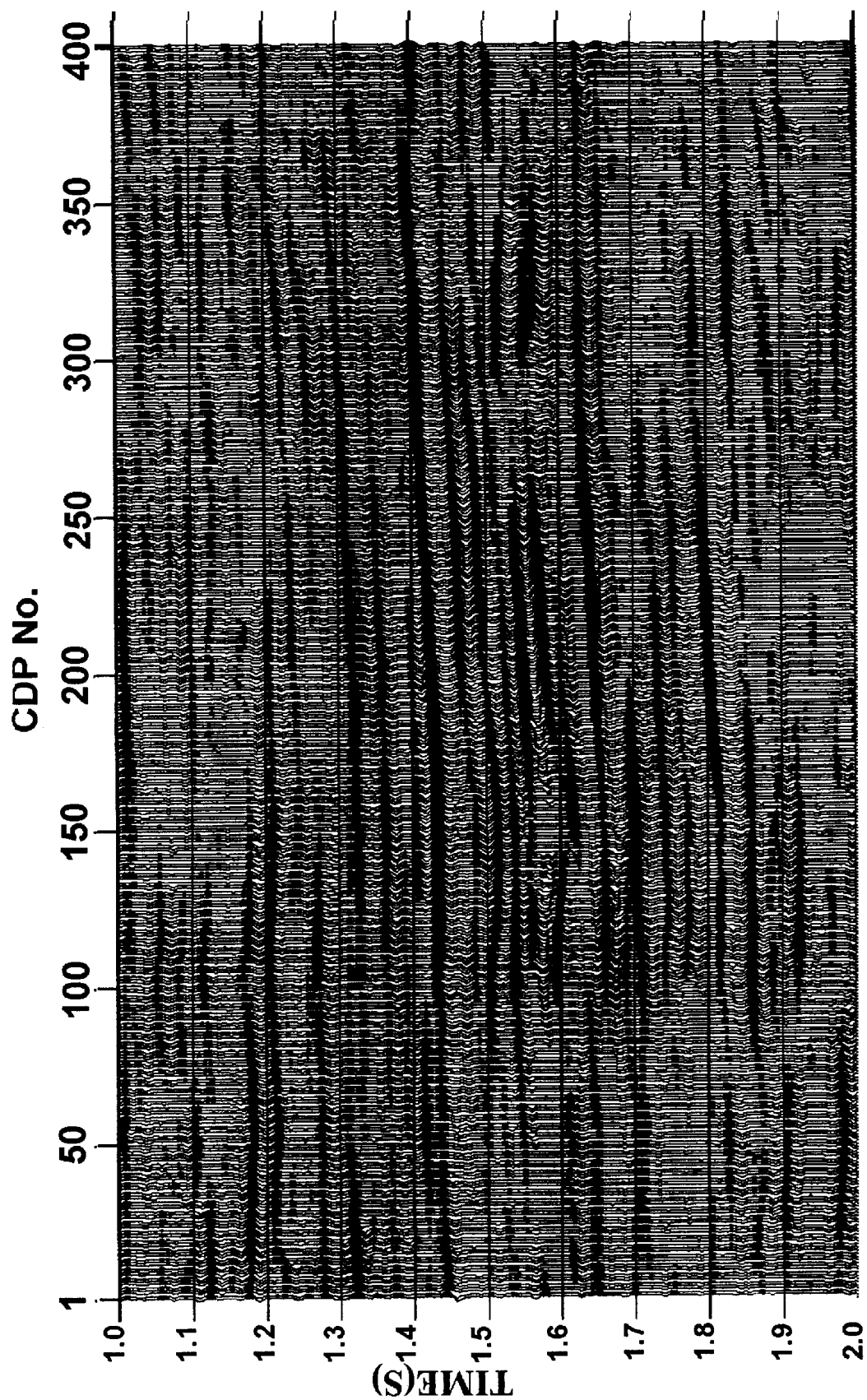
FIG. 6 shows the profile of B (i.e. $\Delta\mu/(\lambda+2\mu)$) of the 1 st group of DHls.
Figure 7:
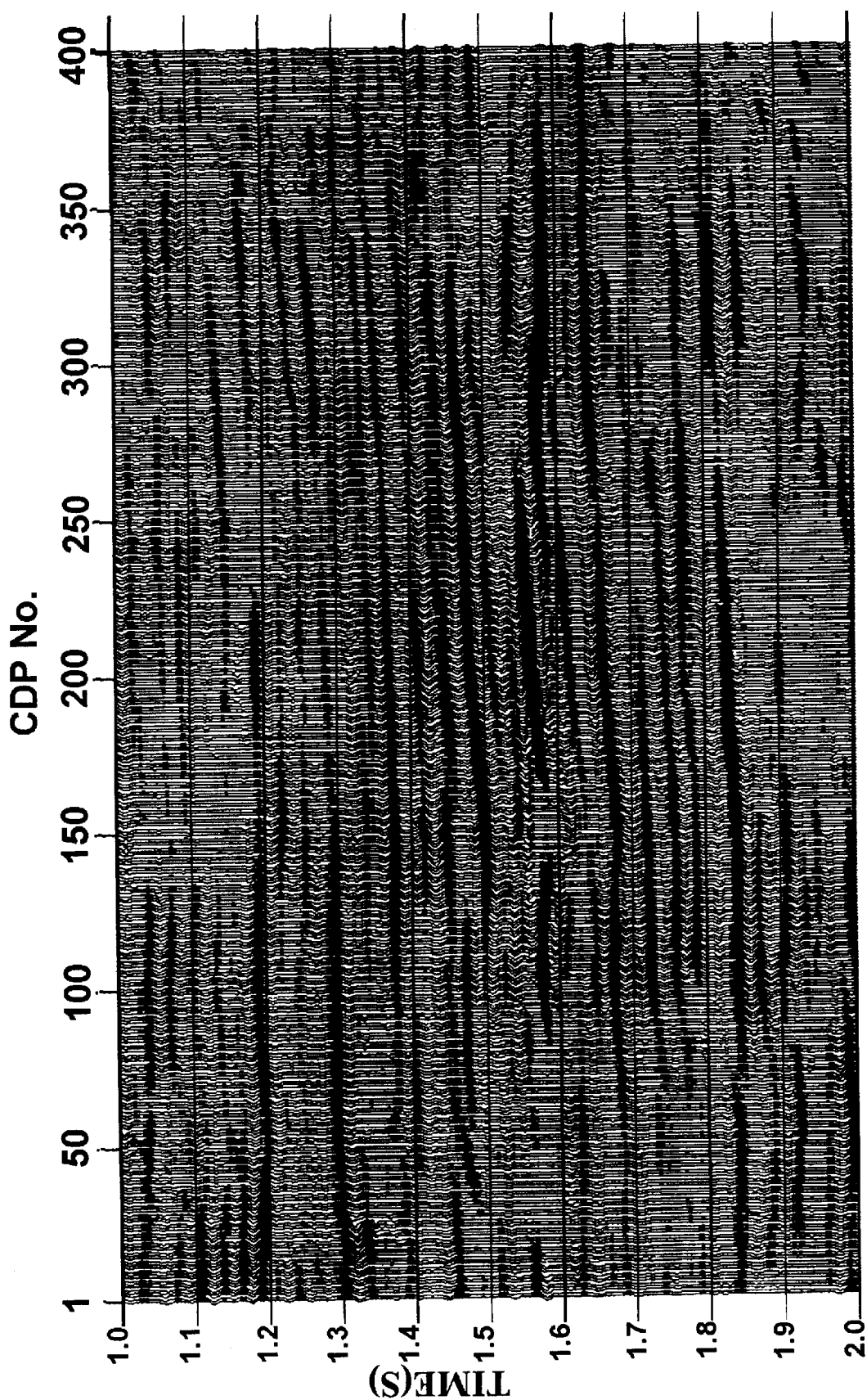
FIG. 7 shows the profile of C (i.e. $\Delta\rho/\rho$) of the 1 st group of DHls.
Figure 8:
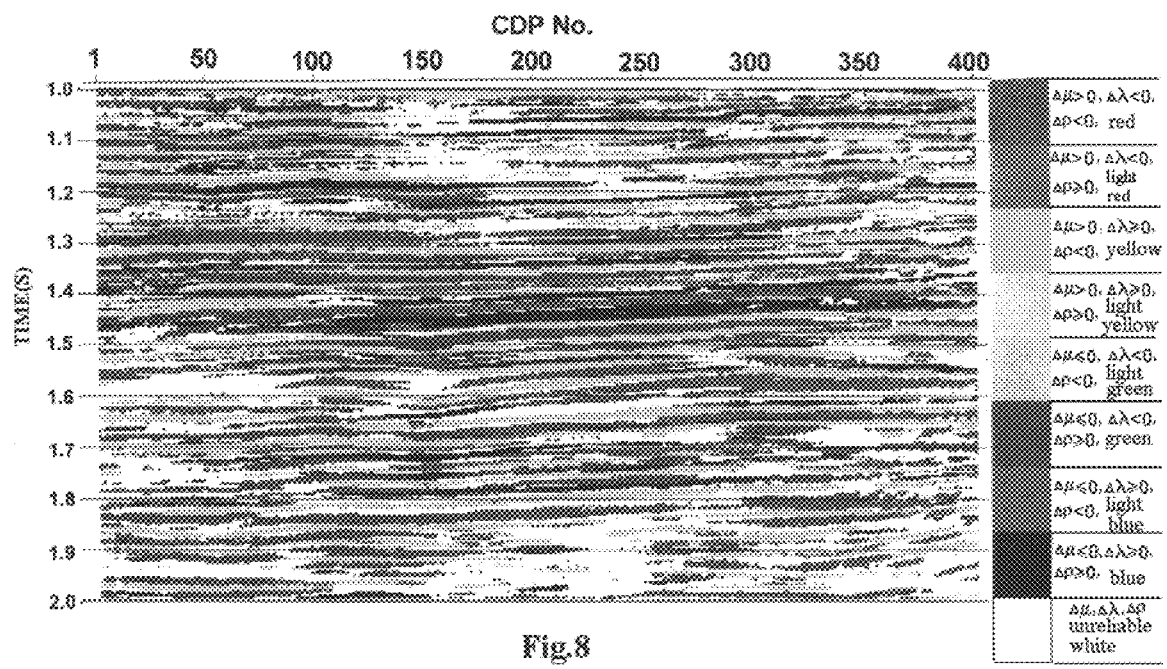
FIG. 8 shows the comprehensive detection profile of the 1 st group of DHls.
Figure 9:
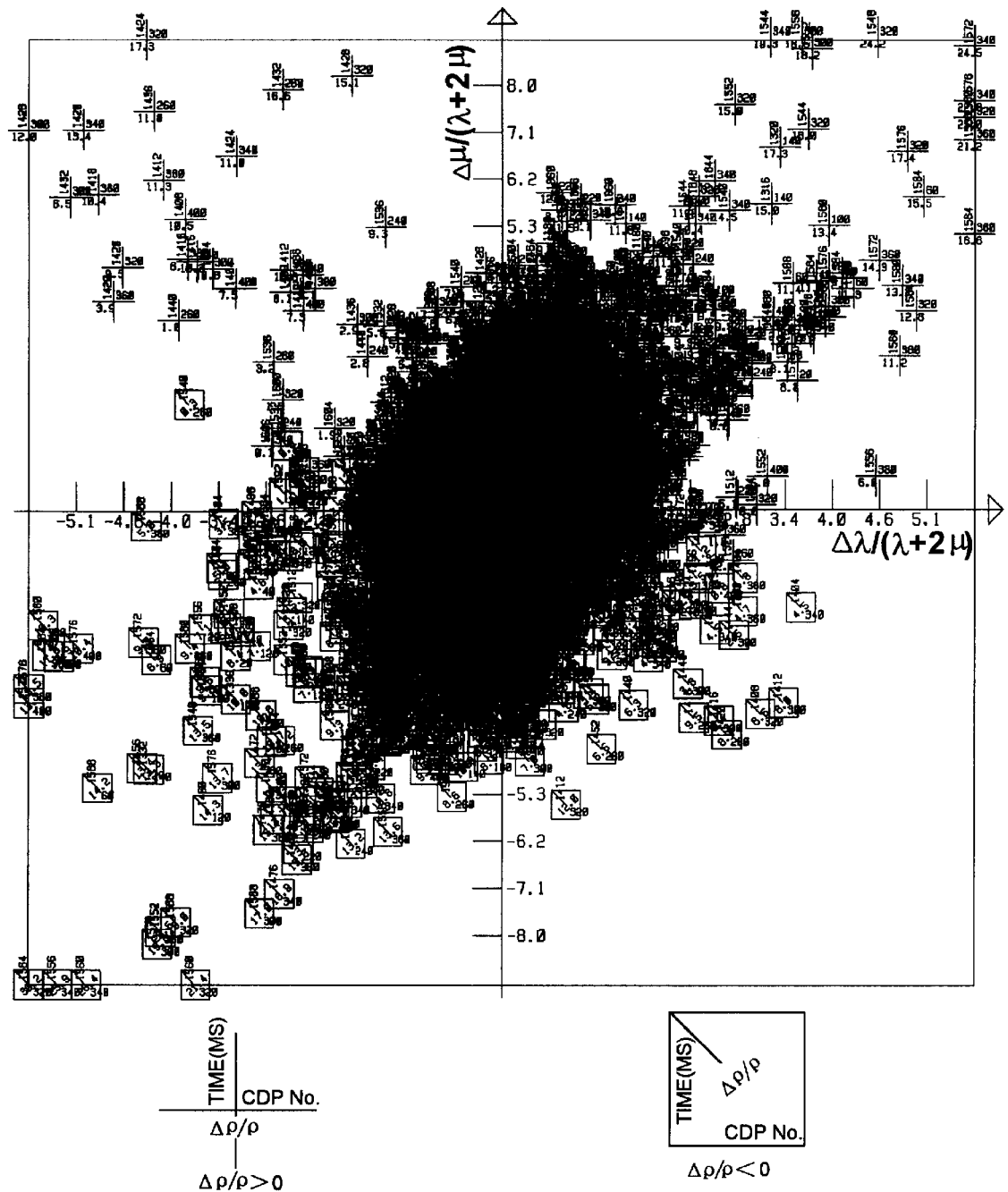
FIG. 9 shows the crossplot diagram of the 1 st group of DHls.
Figure 10:
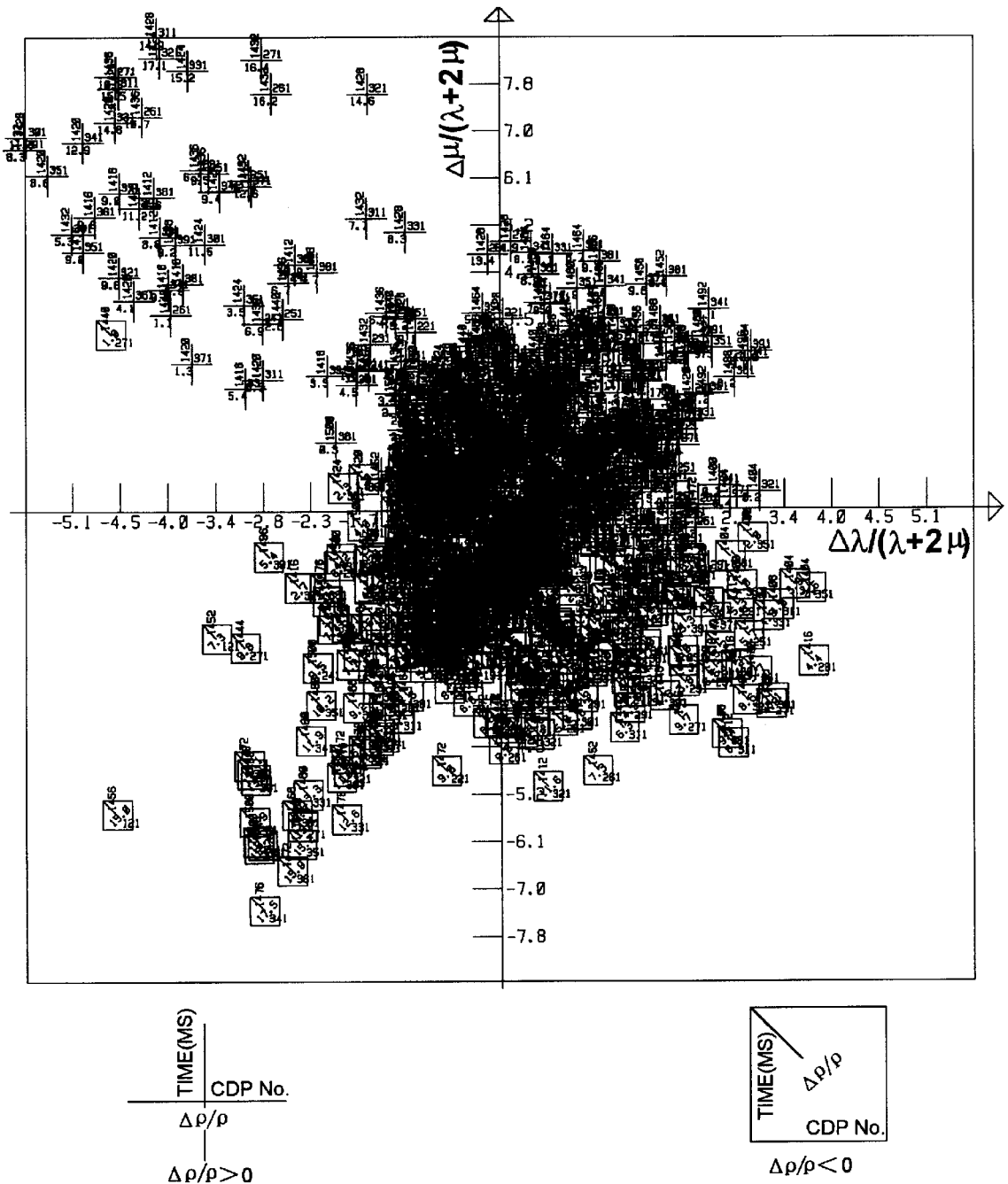
FIG. 10 shows the crossplot diagram of the 1 st group of DHls (along the layers of geologic formation).

FIG. 5 to FIG. 10 show the processing results of a seismic line which passes through the top of a gas-reservoir. All the DHIs shown in these figures are the 1 st group of DHIs FIG. 8 shows the comprehensive direct hydrocarbon detection profile. The red events between 1.4 second~1.5 second in FIG. 8 indicate the position of the gas-reservoir. This is consistent with the characteristics of the three DHIs shown in FIG. 5 to FIG. 7. FIG. 9 shows the crossplot diagram in which the time range is from 1.0 second~2.0 second; and the data are selected one CDP each 20 CDP. Crosspoints in the second quadrant with ρ<0 indicates possible gas accumulation. FIG. 10 shows the crossplot diagram along the layers of geologic formation in which time range is from 1.4 second~1.5 second, and the data are selected one CDP each 5 CDP FIG. 10 is used for checking the positions of possible gas-sands. Because of small scale used in FIG. 9 and 10, the crosspoints are concentrated on the central part.

Figure 5:
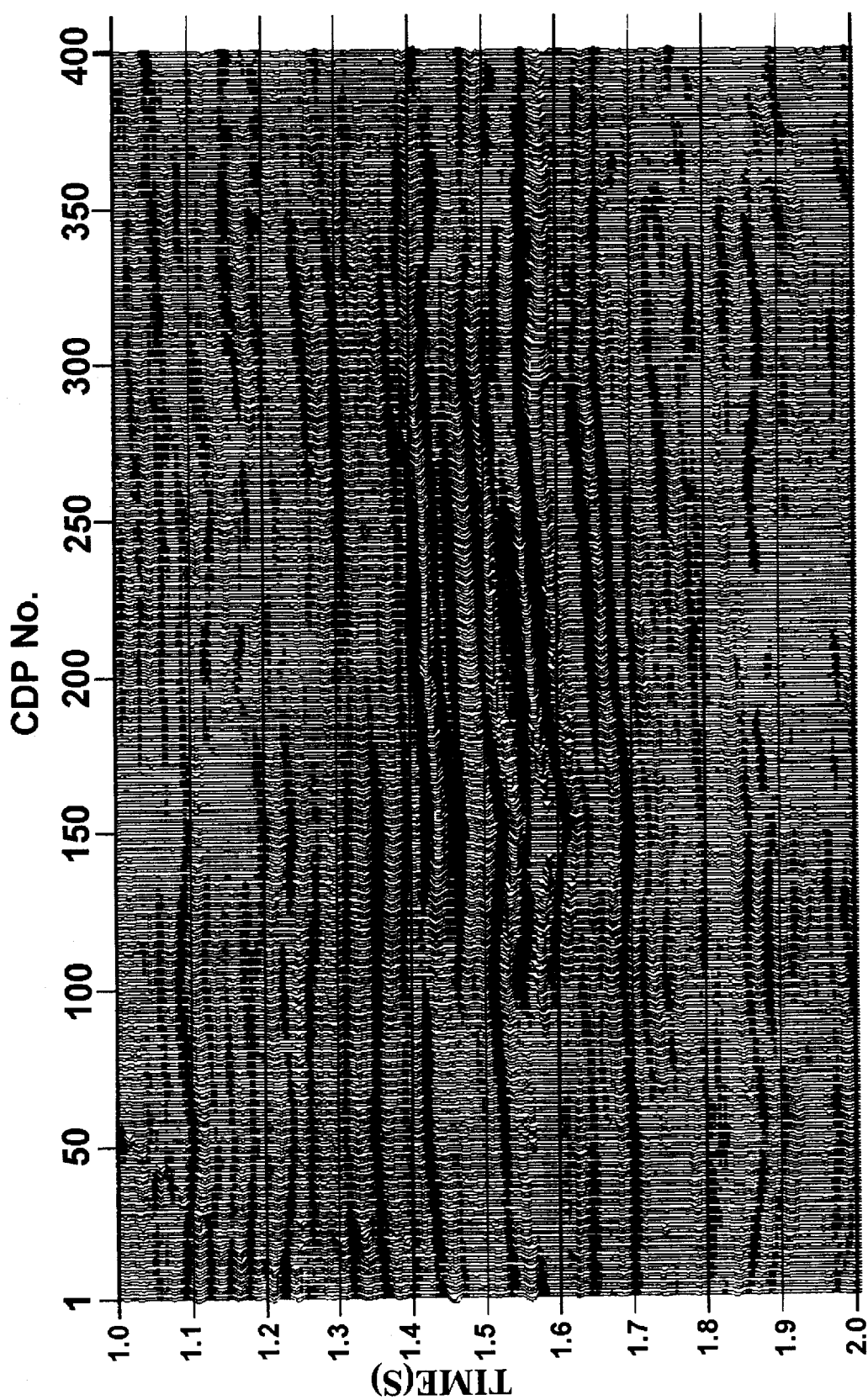
FIG. 5 shows the profile of A (i,e. $\Delta\lambda/(\lambda+2\mu)$) of the 1 st group of DHls.

It is recognized that FIG. 5 to FIG. 7 will be displayed in color and information about rock physics of target project will be collected as much as possible when the method and figures provided by the present invention are used for direct hydrocarbon detection and rock property study.

The present invention estimates new physical parameters DHIs which predict hydrocarbon deposits via predicting changes in characteristics of geologic formations and their pore-filling-fluid; and so it is effective. To implement the method provided by the present invention needs only some computer programming, the seismic data processing software at hand, seismic data in warehouse or seismic data collected. And so it is easy to be implemented. Ideas of the present invention can be used for sonic, density and full-wave logging data processing and interpretation to identity gas/oil reservoir in the well.

I claim:

1. A method for determining, displaying and utilizing the relative changes of elastic moduli and that of density of geologic formations, said relative changes of elastic moduli being the relative change of Lame constant $\Delta\lambda/(\lambda+2\mu)$, the relative changes of shear modulus $\Delta\mu/(\lambda+2\mu)$ and/or $\Delta\mu/[\kappa+(4/3)\mu]$, the relative changes of bulk modulus $\Delta\kappa/[\kappa+(4/3)\mu]$, and said relative change of density being $\Delta\rho/\rho$, comprising the steps of:
   (a) collecting multiple coverage common-mid-point or common-depth-point seismic data using propriety surface detector- and shot-point spreads, the maximum of the incidence angles of seismic waves impinging at the reflection boundary of geologic formations of exploration target being within 30°~45° and being smaller than critical angle in case critical reflection occurring;
   (b) Pre-processing the seismic data to obtain the post-processed and corrected common-reflection-point gathers so that the amplitude-versus-incidence-angle-variation of which at the same reflection time represents the reflection-coefficient-versus-incidence-angle-variation;
   (c) estimating incidence angles of the same sampling time, i.e. the incidence angles from the same reflection point but with different offsets;
   (d) fitting the reflection amplitudes and corresponding incidence angles of the same reflection point with a variety of offsets into the first approximate linear relations:

$R(\theta)=A(1+\sin^2\theta+\sin^2\theta tg^2\theta)/4+B(1-3\sin^2\theta+\sin^2\theta tg^2\theta)/2 +C(1-\sin^2\theta-\sin^2\theta tg^2\theta)/4$ and/or the second approximate linear relations $R(\theta)=D(1+\sin^2\theta+\sin^2\theta tg^2\theta)/4+E(1-5\sin^2\theta+\sin^2\theta tg^2\theta)/3 +C(1-\sin^2\theta-\sin^2\theta tg^2\theta)/4$ which results in two over-determined linear equation groups; where $A=\Delta\lambda/(\lambda+2\mu)$, $B=\Delta\mu/(\lambda+2\mu)$, $C=\Delta\rho/\rho$, $D=\Delta\kappa/[\kappa+(4/3)\mu]$, and $E=\Delta\mu/[\kappa+(4/3)\mu]$;

(e) solving the said over-determined linear equation groups to determine coefficient A, B, C and/or D, E, C;
   (f) repeating steps (c), (d) and (e) for each sampling time of a common-reflection-point gather,
   (g) repeating steps (c), (d), (e) and (f) for each common-reflection-point gather of a line,
   (h) displaying said coefficients determined above of each over-determined linear equation group by three plotting methods of which are the single relative change profile, the comprehensive direct hydrocarbon detection profile and the crossplot; for the single relative change profile plotting method, one relative change, i.e. one coefficient, is plotted in one figure; for the comprehensive direct hydrocarbon detection profile plotting method, the three coefficients of one over-determined linear equation group being specially combined into one figure, according to their signs of value (i.e. positive or negative) or according to that they are bigger or smaller than their thresholds, being represented by different colors or symbols; for the plotting method of 2-dimensional crossplot, one coefficient from the three coefficients of one over-determined linear equation group being selected as reference variable while the other two coefficients as the abscissa and ordinate variable respectively, and different symbols or colors being used for representing positive or negative of the reference variable; for the plotting method of 3-dimensional crossplot, the three coefficients of one over-determined linear equation group being selected as X-, Y- and Z-variable, respectively.

2. A method for determining, displaying and utilizing the relative changes of elastic moduli and that of density of geologic formations according to claim 1 wherein said seismic data pre-processing flow consists of amplitude recovery and compensation, surface consistent correction, filtering, velocity analysis, normal moveout correction, muting, deconvolution, wavelet compression DMO and pre-stacking migration.

3. A method for determining, displaying and utilizing the relative changes of elastic moduli and that of density of geologic formations according to claim 1 wherein said incidence angle θ is estimated according to offset and reflection point depth and the calculation procedure of incidence angle θ varies according to the complexity of the underground structure.

4. A method for determining, displaying and utilizing the relative changes of elastic moduli and that of density of geologic formations according to claim 1 wherein said plotting modes' displaying spaces are horizontal space~time, horizontal space~depth, horizontal space~horizontal space (i.e. time slice), depth~depth (i.e. depth slice), or solid or perspective figures.

5. A method for predicting gas/oil reservoir position by using the relative changes and displaying pictures determined by the method according to claim 1, comprising the steps of:
   (a) Dividing the relative changes determined by the method according to claim 1 into two groups of direct hydrocarbon indicators, the first group of direct hydrocarbon indicators including A, B, C with $A=\Delta\lambda/(\lambda+2\mu)$, $B=\Delta\mu/(\lambda+2\mu)$, $C=\Delta\rho/\rho$, and the second group of direct hydrocarbon indicators including D, E, C with $D=\Delta\kappa/[\kappa+(4/3)\mu]$, $E=\Delta\mu/[\kappa+(4/3)\mu]$, $C=\Delta\rho/\rho$;
   (b) Determining the threshold of each direct hydrocarbon indicator by experience;
   (c) Plotting the comprehensive direct hydrocarbon detection profile using the thresholds determined above and the plotting method according to claim 1;

(d) Predicting gas/oil reservoir position according to the comprehensive direct hydrocarbon detection profiles; if the first group of direct hydrocarbon indicators is used, the possible gas/oil reservoir position is indicated by the area wherein the relative change of shear modulus $\Delta\mu/(\lambda+2\mu)$ is larger than its threshold and both the relative change of Lame constant $\Delta\lambda/(\lambda+2\mu)$ and the relative change of density $\Delta\rho/\rho$ are smaller than the corresponding thresholds; if the second group of direct hydrocarbon indicators is used, the possible gas/oil reservoir position is indicated by the area wherein the relative change of shear modulus $\Delta\mu/(\lambda+2\mu)$ is larger than its threshold and both the relative change of bulk modulus $\Delta\kappa/[\kappa+(4/3)\mu]$ and the relative change of density $\Delta\rho/\rho$ are smaller than the corresponding thresholds.

6. A method according to claim 5 wherein in step (b) the factors for determining the threshold of each direct hydrocarbon indicator includes the reflection characteristics of exploration targets, the background value of each direct hydrocarbon indicator from the single relative change profile and crossplot, research achievements in rock physics and logging data.

\* \* \* \* \*

UNITED STATES PATENT AND TRADEMARK OFFICE
CERTIFICATE OF CORRECTION

PATENT NO. : 6,091,669
DATED : July 18, 2000
INVENTOR(S) : Chen

It is certified that error appears in the above-identified patent and that said Letters Patent is hereby corrected as shown below:

Column 7, line 40, at the end of the line, insert --(14)--; line 55, "$R(\theta) \cong D1+\sin^2\theta+\sin^2\theta tg^2\theta)/4$" should read -- $R(\theta) \cong D(1+\sin^2\theta+\sin^2\theta tg^2\theta)/4$--; line 57, "$+E(1-5\sin^2\theta+\sin^2\theta tg^2\theta)3+C(1-\sin^2\theta-\sin^2\theta tg^2\theta)/4$" should read --$+E(1-5\sin^2\theta+\sin^2\theta tg^2\theta)/3+C(1-\sin^2\theta-\sin^2\theta tg^2\theta)/4$--; line 62, "$D \cong \Delta\kappa/[\kappa+(4/3)\mu]$" should read --$D=\Delta\kappa/[\kappa+(4/3)\mu]$--; line 65, "$C=\kappa\rho/\rho$" should read --$C=\Delta\rho/\rho$--.

Column 15, line 33, "$\Delta\lambda(\lambda+2\ \mu)$" should read --$\Delta\lambda/(\lambda+2\mu)$--; line 34, "$\Delta\mu(\lambda+2\ \mu)$" should read --$\Delta\mu/(\lambda+2\mu)$--; line 59, "$R(\theta) \equiv A(1+\sin^2\theta+\sin^2\theta tg\ ^2\theta)/4+B(1-3\sin^2\theta+\sin\ ^2\theta tg^2\theta)/2+C(1-\sin^2\theta-\sin^2\theta tg^2\theta)/4$" should read --$R(\theta) \cong A(1+\sin^2\theta+\sin^2\theta tg^2\theta)/4+B(1-3\sin^2\theta+\sin^2\theta tg^2\theta)/2+C(1-\sin^2\theta-\sin^2\theta tg^2\theta)/4$--; line 63, "$R(\theta) \equiv D(1+\sin^2\theta+\sin^2\theta tg^2\theta)/4+E(1-5\sin^2\theta+\sin^2\theta tg^2\theta)/3 +C(1-\sin^2\theta-\sin^2\theta tg^2\theta)/4$" should read --$R(\theta) \cong D(1+\sin^2\theta+\sin^2\theta tg^2\theta)/4+E(1-5\sin^2\theta+\sin^2\theta tg^2\theta)/3 +C(1-\sin^2\theta-\sin^2\theta tg^2\theta)/4$--.

Signed and Sealed this

Seventeenth Day of April, 2001

*Attest:*

NICHOLAS P. GODICI

*Attesting Officer*   *Acting Director of the United States Patent and Trademark Office*